(12) United States Patent
Bolte et al.

(10) Patent No.: US 9,971,783 B2
(45) Date of Patent: May 15, 2018

(54) DATA DE-DUPLICATION FOR DISK IMAGE FILES

(71) Applicant: International Business Machines Corporation, Armonk, NY (US)

(72) Inventors: Dirk Bolte, Birkenfeld (DE); Herwig Elfering, Boeblingen (DE); Susanne Friedhilde Heisser, Boeblingen (DE); Juergen Nowak, Boeblingen (DE); Thomas Pohl, Boeblingen (DE); Martin Troester, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 470 days.

(21) Appl. No.: 14/165,816

(22) Filed: Jan. 28, 2014

(65) Prior Publication Data

US 2014/0214776 A1 Jul. 31, 2014

(30) Foreign Application Priority Data

Jan. 29, 2013 (GB) .................................. 1301542.5

(51) Int. Cl.
*G06F 17/30* (2006.01)
(52) U.S. Cl.
CPC .............................. *G06F 17/30156* (2013.01)
(58) Field of Classification Search
CPC ................................................ G06F 17/30156
USPC ....................................................... 707/692
See application file for complete search history.

(56) References Cited

U.S. PATENT DOCUMENTS

| 8,191,065 | B2 | 5/2012 | Frank | |
| 2008/0243769 | A1* | 10/2008 | Arbour | ............... G06F 11/1453 |
| 2009/0006713 | A1* | 1/2009 | Royer | ................... G06F 3/0607 |
| | | | | 711/6 |
| 2009/0063528 | A1 | 3/2009 | Yueh | |

(Continued)

FOREIGN PATENT DOCUMENTS

WO 2009033074 A2 3/2009

OTHER PUBLICATIONS

K. R. Jayaram et al., "An Empirical Analysis of Similarity in Virtual Machine Images," Middleware 2011 Industry Track; Lisbon, Portugal; Dec. 12, 2011.

(Continued)

*Primary Examiner* — Joshua Bullock
(74) *Attorney, Agent, or Firm* — The Steadman Law Firm PLLC

(57) ABSTRACT

The invention relates to a data processing system including at least two disk emulators operating in parallel. Each of the at least two disk emulators emulates a disk subsystem and is associated with a respective file in a file system for any data stored on a physical disk. The data processing system further includes a de-duplicator for de-duplicating the data stored in the respective files associated with the at least two disk emulators. The de-duplicator operates in parallel to the disk emulators and is associated with an additional disk emulator emulating an additional disk subsystem. The additional disk emulator is associated with an additional file in a file system configured to store data shared between the respective disk subsystems emulated by the at least two disk emulators.

20 Claims, 5 Drawing Sheets

(56) References Cited

U.S. PATENT DOCUMENTS

| | | | | |
|---|---|---|---|---|
| 2009/0063795 A1* | 3/2009 | Yueh | ............... | G06F 3/0608 |
| | | | | 711/162 |
| 2009/0292737 A1 | 11/2009 | Hayton | | |
| 2010/0138827 A1 | 6/2010 | Frank et al. | | |
| 2012/0167087 A1 | 6/2012 | Lee et al. | | |
| 2013/0086006 A1* | 4/2013 | Colgrove | ............. | G06F 3/0688 |
| | | | | 707/692 |

OTHER PUBLICATIONS

Keren Jin, "Deduplication on Virtual Machine Disk Images," Technical Report UCSC-SSRC-10-01, Sep. 2010.

Keren Jin et al., "The Effectiveness of Deduplication on Virtual Machine Disk Images," Systor 2009; Haifa, Israel; May 2009.

Ng, Chun-Ho et al. Live Deduplication Storage of Virtual Machine Images in an Open-Source Cloud. Proceedings of ACM/IFIP/USENIX 12th International Middleware Conference (Middleware'11), Lisbon, Portugal, Dec. 12-16, 2011. [20 pages].

Clements, Austin T. et al. Decentralized Deduplication in SAN Cluster File Systems. UUSENIX'09 Proceedings of the 2009 conference on USENIX Annual technical conference, San Diego, CA, Jun. 14-19, 2009. [14 pages].

ZFS Deduplication, Oracle Jeff Bonwick's Blog. Nov. 2, 2009. [6 pages] <https://blogs.oracle.com/bonwick/zfs-deduplication-v2>.

* cited by examiner

DATA DE-DUPLICATION FOR DISK IMAGE FILES

FIELD OF THE INVENTION

The present invention relates in general to data processing systems, and in particular, to a data processing system comprising data de-duplication for disk image files, particularly on shared storage systems in cloud environments.

BACKGROUND OF THE INVENTION

In a computer cloud environment, multiple virtual machines (VM) are usually run on the same host computer. Virtualization allows multiplexing of the underlying host computer between different virtual machines. The host computer allocates a certain amount of its resources to each of the virtual machines. Each virtual machine is then able to use the allocated resources to execute applications, including operating systems (OS, here referred to as guest operating system). The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the computer. Virtual machine disks are often encapsulated into files, making it possible to rapidly save, copy, and provide a virtual machine. Full systems (fully configured applications, operating systems, BIOS and virtual hardware) can be moved, within seconds, from one physical server to another for zero downtime maintenance and continuous workload consolidation.

A computer environment including memory for the temporary storage of data and disk or other storage for the persistent storage of data is virtualized by providing an abstraction or virtualization layer on the computer environment. One or more server applications are operated on the virtualization layer, each configured to read data from storage into memory and to write data from memory to storage during operation. The virtualization layer provides a representation of resources (such as memory, storage, and the like) within the computer environment to the server applications. One or more server applications are encapsulated within a virtual machine and provided with an OS to manage corresponding virtualized hardware and software resources presented to each server application.

During VM lifetime, the amount of data added to the VM's disks grows steadily, because often similar and/or same operating systems and/or user data are stored several times on these disks. Identical files may reside in disk caches of a local server multiple times. Additionally, the I/O utilization may become a bottleneck of a computer system, because the more often a cache flushes the often the server has to access the I/O subsystem. When using storage area network (SAN) or network attached storage (NAS) technologies, this also results in increased network utilization.

U.S. 2009/0063528 A1 describes a data de-duplication application that is operated in a computer environment to reduce redundant data in memory and/or storage. The de-duplication application identifies redundant data and replaces it with a reference and/or pointers to a copy of the data that is already present in the memory or storage.

U.S. Pat. No. 8,191,065 B2 describes a method and a system for managing images of virtual machines hosted by a server. The system includes a common data storage to store a base virtual machine image shared by the virtual machines, and one or more individual data storages to store incremental images specific to respective virtual machines. The server detects image modifications that are common to the virtual machines, and copies these common modifications to the base virtual machine image in the common data storage. In addition, the server adds pointers to the copied modifications in the common data storage to incremental VM images in the individual data storages.

SUMMARY

One aspect of the invention provides a data processing system comprising data de-duplication in order to optimize space consumption on local and shared storage systems, particularly in cloud environments.

Another aspect of the invention provides a computer program product for data de-duplication in order to optimize space consumption on local and shared storage systems, particularly in cloud environments.

According to an aspect of the invention a data processing system is proposed, which comprises at least two disk emulators, which are operating in parallel and emulating a disk subsystem each, the disk emulators each using a file in a file system for any data stored on the respective disk. A separate de-duplicator is comprised for de-duplicating the data stored in the files, the de-duplicator operating in parallel to the disk emulators, the de-duplicator further using an additional disk emulator emulating an additional disk subsystem by using an additional file in a file system for storing data shared between the other disk subsystems.

The additional file is accessible by all disk emulators. The de-duplicator comprises duplication identification means for communicating with the disk emulators to identify duplicated data in the respective files, storing means responsive to the duplication identification means to retrieve duplicated data from the files and store it in the additional file via the additional disk emulator, linking means responsive to the storing means to instruct a disk emulator to delete the retrieved duplicated data in its file and replace it with a reference to the duplicated data in the additional file. Upon receiving an instruction to delete and replace data from the de-duplicator a disk emulator performs an atomic operation to delete the respective data and replace it with a reference to the respective data in the additional file.

An atomic operation is to be understood, as usually in concurrent programming, as an operation or a set of operations, which is linearizable, indivisible or uninterruptible, as it appears to the rest of the data processing system to occur instantaneously. Atomicity is a guarantee of isolation of the operation from concurrent processes. Storing and retrieving any data block in the data processing system described herein should be performed by an atomic operation, in order to do not overlap any writing operation with any de-duplication operation.

A data processing system according to the invention favorably avoids several problems which occur quite often in host environments with multiple virtual images. For example, if more than one virtual image exists in a data processing system there may exist potential duplicates of data especially if multiple virtual images contain similar content, as for using similar or same operating systems, similar or same (server) application, and/or using similar user data. Therefore, according to the invention, space consumption on shared storage systems can be reduced, identical files in caches may be avoided, and/or the access frequency of caches in I/O network utilization can be reduced, which allows to optimize the performance of servers that otherwise could become a bottleneck for data I/O.

The de-duplicator may be operable at runtime of the data processing system. Thus, the running environment is affected to a minimal degree by the de-duplication process which avoids degradation of performance of the running data processing system.

The de-duplicator may be using at least one virtual block mapping table to store and retrieve data in the common data image, which offers a significant advantage compared to state of the art delta image processes, as there is no time-consuming compression/de-compression process involved but the original data may be retrieved.

In the data processing system a mapping instance may be added to an existing virtual disk process. Whenever data is read, the disk emulation process first checks the virtual block map table to find out if data is stored in a repository common for multiple VMs. If yes, the disk emulation process dereferences the link to that data and returns the data from the common data image. If not, the disk emulation process goes to the virtual disk of the VM (which may exist unchanged). The block map table is created and maintained by an outside process which can access all virtual disks.

The data processing system may comprise a separate virtual block mapping table for each virtual image of the data processing system. So a maximal flexibility of the system to store and retrieve data may be achieved when applying the de-duplication process in a running system.

The virtual block mapping table may map block numbers, which enhances the speed of retrieval from common data storages significantly.

The duplication identification means may use a block by block comparison method to identify duplicated data of virtual images, representing a relatively simple and easy-to-implement embodiment for identifying identical data in different virtual images.

In a further embodiment, the duplication identification means may use a file-aware block comparison method to identify duplicated data of virtual images. This enables optimization of the identification process in a very efficient way, as additional information on files for which identical blocks shall be identified is used to locate the relevant data blocks.

In another embodiment, the duplication identification means comprise hashing a plurality of blocks to identify duplicated data of virtual images. This represents another efficient way of identifying identical blocks via obtaining hash functions of these blocks. The hash function may be a general-purpose hash function (e.g., checksums), a special-purpose hash function, a cryptographic hash function or other known hash functions. The result of these hash functions are signature values which serve as a unique identifier of the content of the corresponding block. Thus, the signature values of blocks may be used to identify duplicated blocks of virtual images.

The de-duplicator may be operable on more than one host server. Thus, the de-duplicator may be extended across host borders and for example find the best pattern of common data storages, which may be of special importance if a number of blocks shall be identified for data de-duplication.

According to a further aspect of the invention a data processing program for execution in a data processing system is proposed comprising an implementation of an instruction set for running the data processing system as described above when the data processing program is run on a computer.

Further, a computer program product is proposed comprising a computer usable medium including a computer readable program, wherein the computer readable program when executed on a computer causes the computer to run a data processing system comprising at least two disk emulators operating in parallel and emulating a disk subsystem each, the disk emulators each using a file in a file system for any data stored on the respective disk, a separate de-duplicator for de-duplicating the data stored in the files, the de-duplicator operating in parallel to the disk emulators, the de-duplicator further using an additional disk emulator emulating an additional disk subsystem by using an additional file for storing data shared between the other disk subsystems, and wherein all disk emulators can access the additional file. The de-duplicator comprises duplication identification means for communicating with the disk emulators to identify duplicated data in the respective files, storing means responsive to the duplication identification means to retrieve duplicated data from the files and store it in the additional file via the additional disk emulator, and linking means responsive to the storing means to instruct a disk emulator to delete the retrieved duplicated data in its file and replace it with a reference to the duplicated data in the additional file. Upon receiving an instruction to delete and replace data from the de-duplicator a disk emulator performs an atomic operation to delete the respective data and replace it with a reference to the respective data in the additional file.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

BRIEF DESCRIPTION OF THE SEVERAL VIEWS OF THE DRAWINGS

The present invention may best be understood from the following detailed description of the embodiments, but not restricted to the embodiments, wherein is shown in.

DETAILED DESCRIPTION OF THE DRAWINGS

Figure 1:
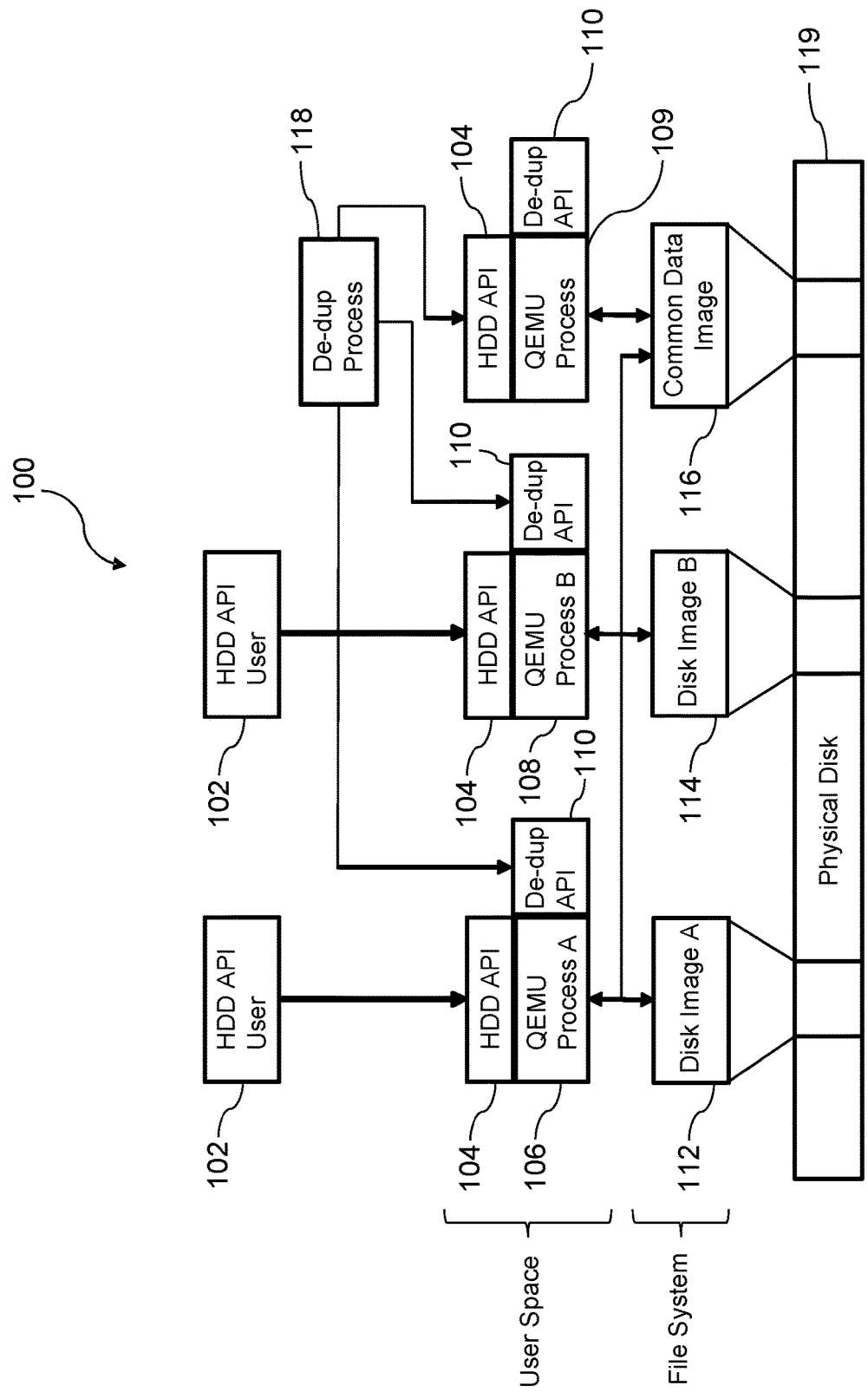
FIG. 1 a system overview of a data processing system using a disk emulation process for de-duplication of common data according to an example embodiment of the invention.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

FIG. 1 shows a system overview of a data processing system 100 using a disk emulator process for de-duplication of common data according to an example embodiment of the invention. The data processing system 100 is explained in essential processes related to a de-duplicator process, but not in all aspects and components, respectively, concerning a data processing system running.

The data processing system 100, comprises at least two disk emulators 106, 108 (QEMU is an abbreviation of Quick Emulator, a commonly used system for disk emulation), which are operating in parallel and emulating a disk subsystem each, represented as a file 112, 114 in a file system for any data stored on a respective physical disk 119. A separate de-duplicator 118 exists for de-duplicating the data stored in the files 112, 114, the de-duplicator 118 operating in parallel to the disk emulators 106, 108, the de-duplicator 118 further using an additional disk emulator 109 emulating an additional disk subsystem by using an additional file (i.e., common data image) 116 in a file system for storing data shared between the other disk subsystems, represented in files 112, 114.

At least one file system is running on physical disk 119. At least two virtual machines are deployed on the system 100, resulting in a disk image A, file 112 and a disk image B, file 114. VM deployment is initiated by a user via a user hard disk drive (HDD) application programming interface (API) 102 and a corresponding HDD API 104 in a user space launching an disk emulator process A 106 as well as a disk emulator process B 108. The de-duplicator process 118 launches a separate disk emulator process 109 for storing and/or controlling the data common to the at least two VMs running on the system 100. The de-duplicator process 118 communicates with the disk emulator processes 106, 108, 109 with a de-duplicator API 110. There it should be mentioned that the two disk emulators 106 and 108 do not need to be launched separately but that they could be launched by the de-duplicator process 118 too, in order to involve files currently in use as well as files not in use in the de-duplication process 118.

The disk emulators 106, 108, 109 can access the additional file 116. The de-duplicator 118 comprises duplication identification means for communicating with the disk emulators 106, 108, 109 to identify duplicated data in the respective files 112, 114. The duplication identification means are using, for instance, a block by block comparison method to identify duplicated data of virtual images. For optimizing the system efficiency the duplication identification means may further use a file-aware block comparison method to identify duplicated data of virtual images. Storing means responsive to the duplication identification means to retrieve duplicated data from the files 112, 114 and store it in the additional file 116 via the additional disk emulator 109 are foreseen. Linking means responsive to the storing means to instruct a disk emulator 106, 108 to delete the retrieved duplicated data in its file 112, 114 and replace it with a reference to the duplicated data in the additional file 116 are also foreseen. Upon receiving an instruction to delete and replace data from the de-duplicator 118 a disk emulator 106, 108 performs an atomic operation to delete the respective data and replaces it with a reference to the respective data in the additional file 116.

It may be mentioned that the de-duplicator 118 is also operable at runtime of the data processing system 100 and principally on more than one host server.

Figure 2:
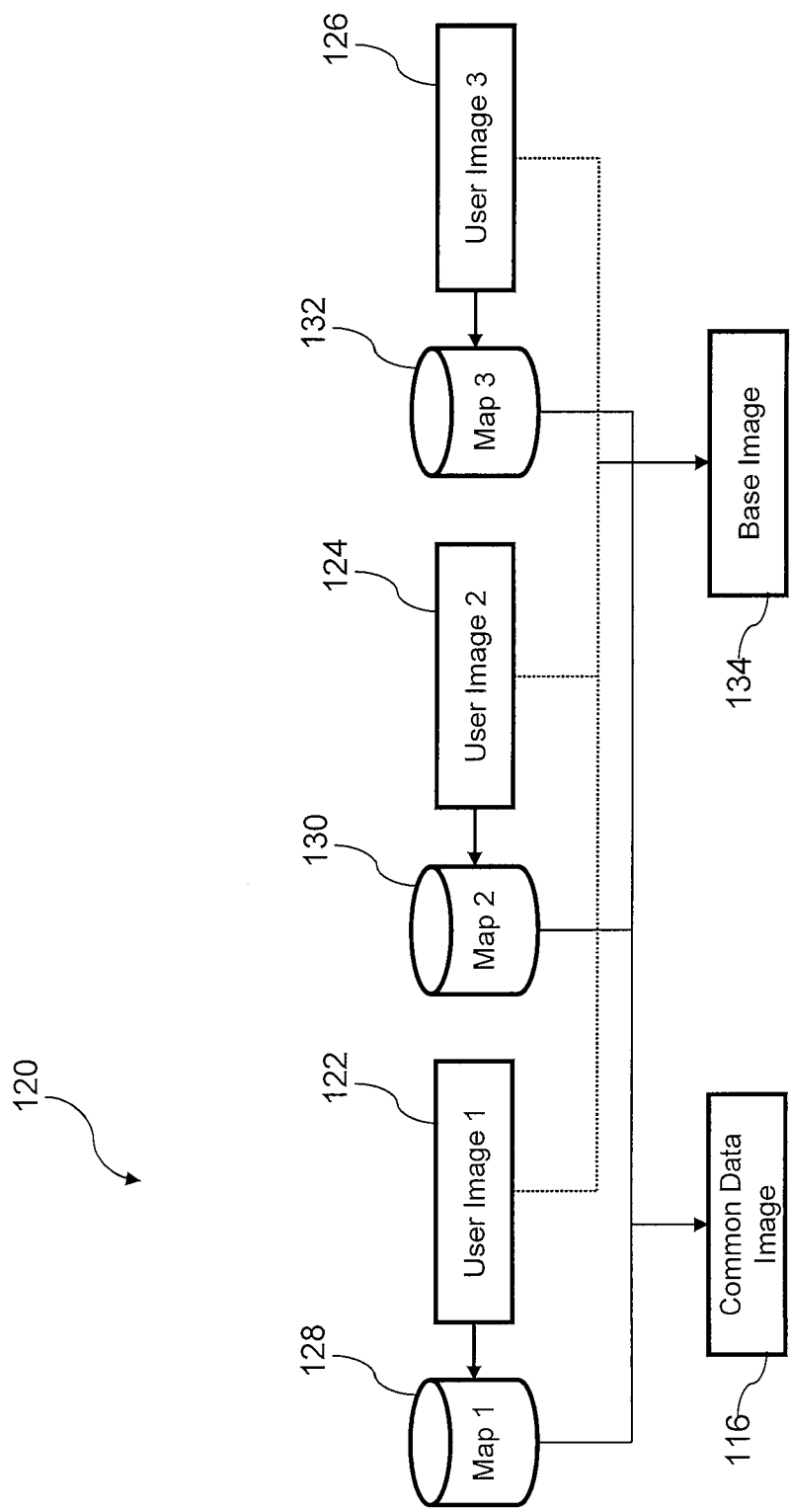
FIG. 2 a disk emulation format adaption process to support virtual image de-duplication according to an example embodiment of the invention.

FIG. 2 depicts an overview of a disk emulation format adaption process 120 to support virtual image de-duplication according to an example embodiment of the invention. There are shown three user images 122, 124, 126 which are all based on a common base image 134. In a standard process these user images 122, 124, 126 would only check if a given block which is referenced by an image is occupied in its layer. Potentially the image would look in the base image 134. According to the invention a virtual block mapping table is used to store and retrieve data in the additional file 116. There exists one block mapping table per user image, table 128 for user image 122, table 130 for image 124 and table 132 for image 126 to store and retrieve data in the additional file 116. The virtual block mapping tables 128, 130, 132 map physical block numbers of files stored in the additional file 116. So via these virtual block mapping tables 128, 130, 132 the user images 122, 124, 126 may access files which represent common data for more than one user image and are stored in the additional file 116.

Figure 3:
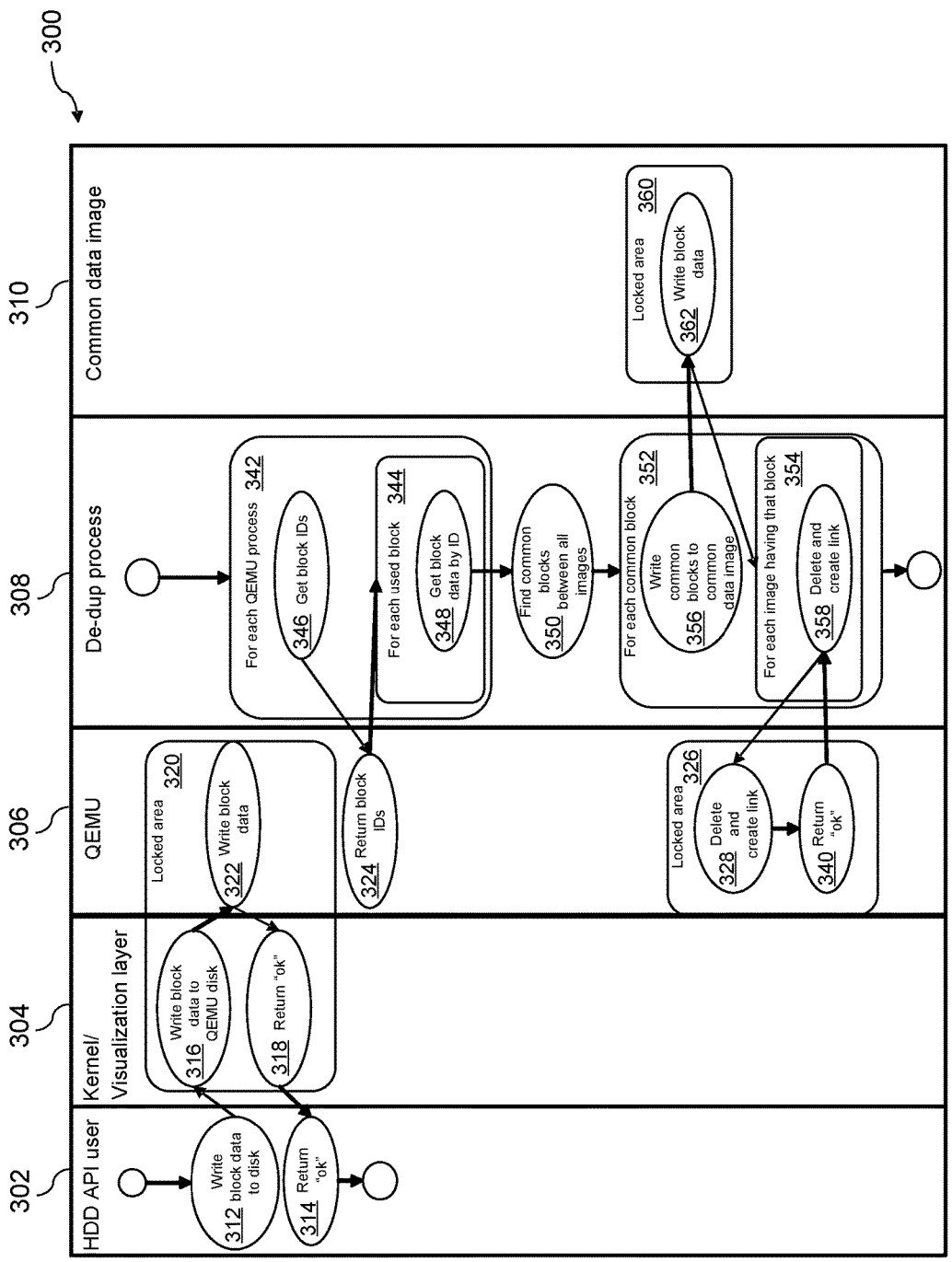
FIG. 3 a de-duplication process flow according to an example embodiment of the invention.

FIG. 3 illustrates a de-duplication process flow 300 according to an example embodiment of the invention. There are depicted different layers of a data processing system, a HDD API user 302, a Kernel/Visualization layer 304, a disk emulator (QEMU) 306, a de-duplicator process 308 and a common data image 310. If a user process requests to write block data to a disk in step 312, there is initiated a request 316 to write these block data to an emulated disk and the disk emulator 306 writes block data 322 in a locked memory area 320. The user process will get in return "ok" via steps 318 and 314. This would be a write block data to disk process according to state of the art. If there is a de-duplication process 308 according to the invention running, for each disk emulator process 342 a request 346 to get block identification information (ID) is initiated. The disk emulator 306 returns the block IDs in 324. Thus for each used block 344, block data may be received, step 348. Next the de-duplication process 308 tries to find common blocks between the virtual images running, step 350 and for each common block to be identified, 352, the common block is written to a common data image 310 initiated in step 356, and executed by step 362, respectively, in a locked memory area 360 of the common data image 310. Then for each image having that common block, 354, there is a request 358 initiated to delete and create a link in a locked area 326 of the disk emulator 306, via request 328, which results in an "ok" returning in step 340, if the subprocess ended correctly.

Figure 4:
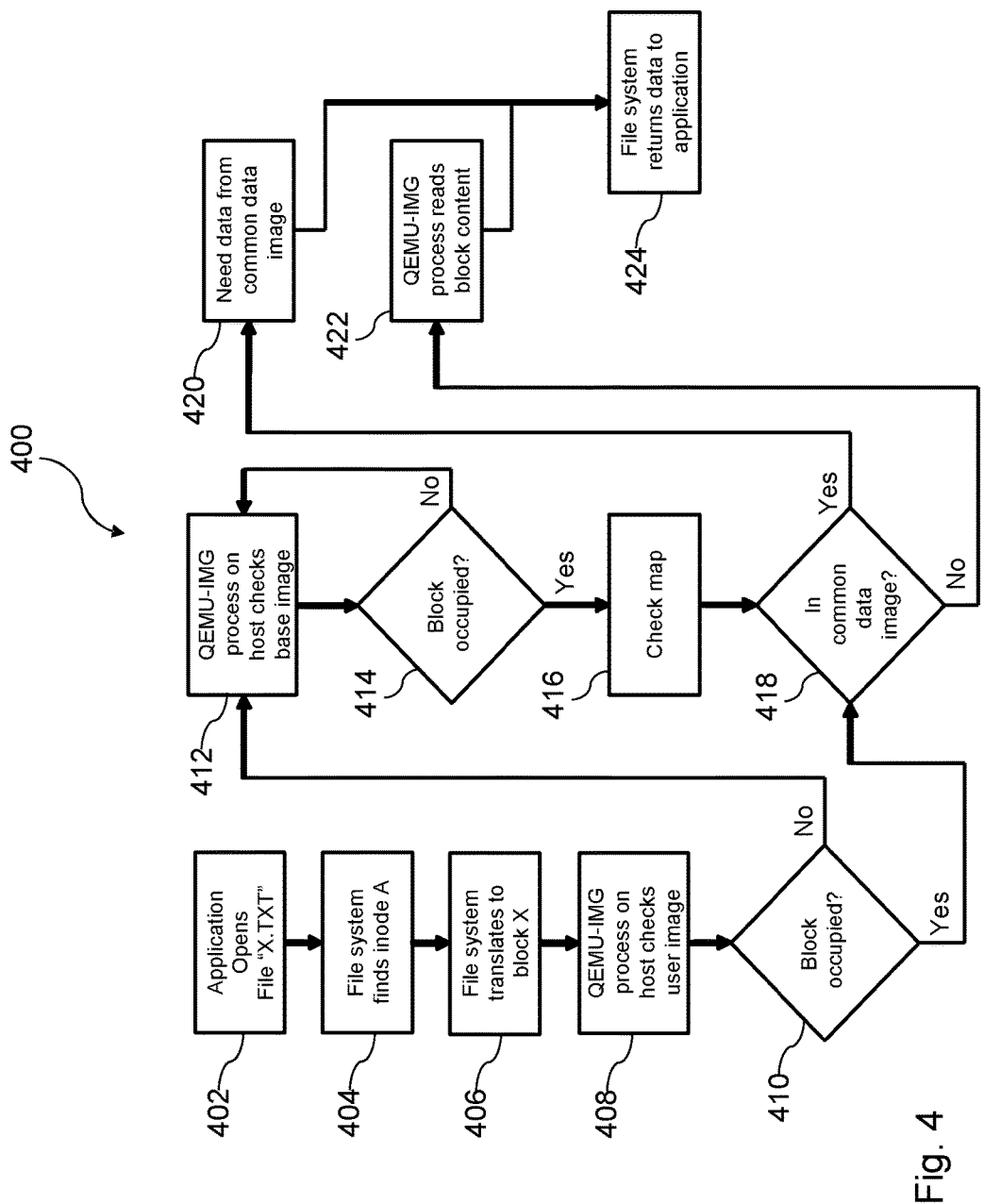
FIG. 4 a flowchart for extending stacked virtual images according to an example embodiment of the invention.

FIG. 4 displays a flowchart 400 for extending stacked virtual images according to an example embodiment of the invention. Process steps 402, 404, 406 and 424, being file system operations from a virtual machine on a process scope, are executed by the API 102 of FIG. 1, whereas all other process steps, being operations on a host scope, are executed by steps 104, 106, 108 of FIG. 1.

If a user application tries to open a file (X.TXT, for instance) in step 402, a file system finds an Mode A in step 404. In computing, an Mode (index node) is a data structure found in many file systems. Each Mode stores all the information about a file system object (file, device node, socket, pipe, etc.), except data content and file name. The file system translates to block X in step 406 and the disk emulator process (QEMU-IMG) on a host system checks a user image, step 408. If the block is occupied, the disk emulation process directly checks, if the block is in a common data image (step 418). If it is so, the block data are requested, step 420, from the common data image, so that the file system is able to return the data to the user application, step 424. If the data in step 418 are not in the common data image, then the disk emulator process reads the block content, step 422, and the file system may also return the data to the application, step 424. If the block is not occupied in step 410, then the disk emulator process on the host system checks a base image, step 412, and again there is a query if the block is occupied, step 414. If no, step 412 is repeated. If yes, a virtual map table is checked, step 416, and proceeded to the query 418, if the block is in the common data image, as before.

Figure 5:
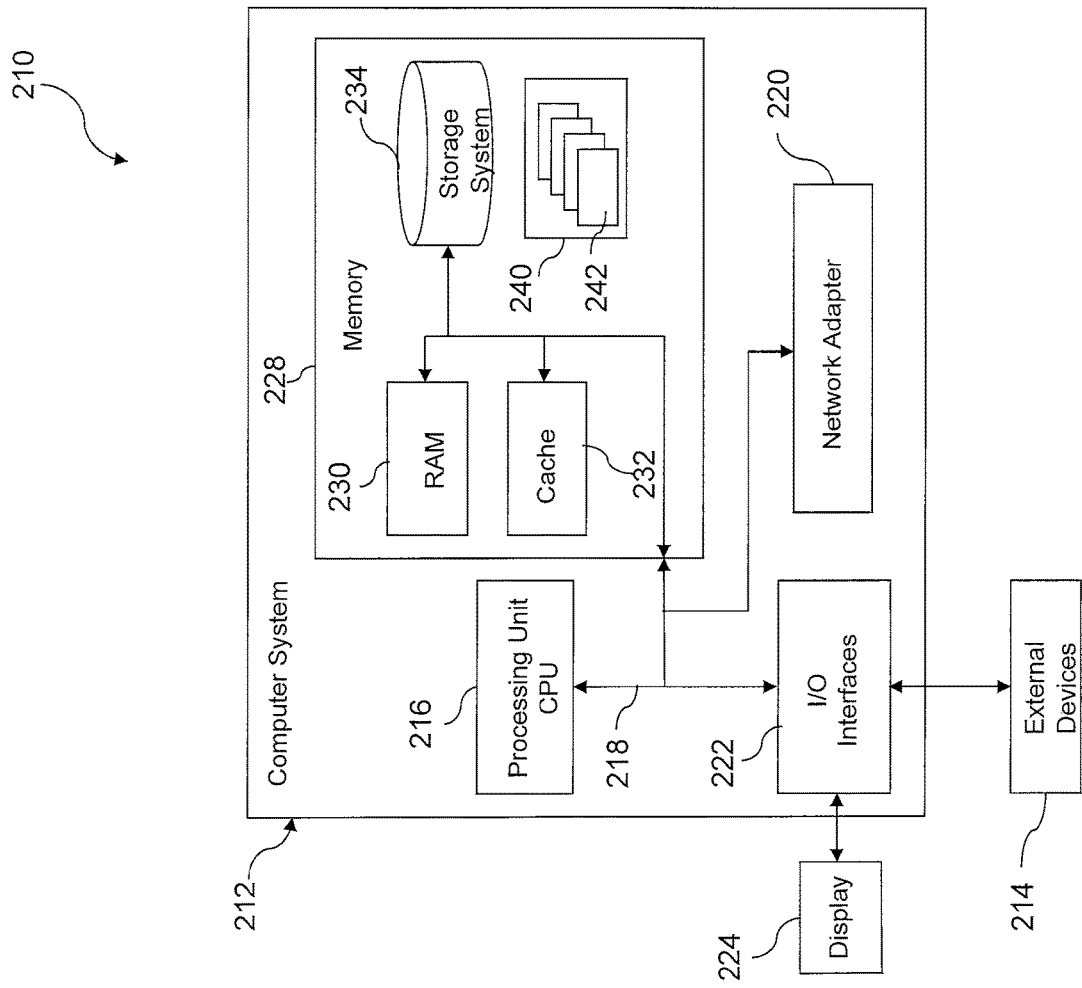
FIG. 5 an example embodiment of a data processing system according to the invention displaying system components.

Referring now to FIG. 5, a schematic of an example of a data processing system 210, displaying system components, is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein. Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The invention claimed is:

1. A data processing system comprising:
a physical disk;
at least two disk emulators operating in parallel, wherein each of the at least two disk emulators emulates a respective disk subsystem and is associated with a respective file in a file system for any data stored on the physical disk; and
a de-duplicator for de-duplicating the data stored in the respective files associated with the at least two disk emulators, wherein the de-duplicator operates in parallel to the at least two disk emulators, wherein the de-duplicator is associated with an additional disk emulator emulating an additional disk subsystem, wherein the additional disk emulator is associated with an additional file in a file system configured to store data shared between the respective disk subsystems emulated by the at least two disk emulators, wherein the additional file is accessible by each of the at least two disk emulators, and wherein the de-duplicator is configured to:
communicate with the at least two disk emulators to identify duplicated data in the respective files associated with the at least two emulators,
retrieve the duplicated data and store the duplicated data in the additional file via the additional disk emulator, and
instruct each disk emulator among the at least two disk emulators that is associated with a respective file having the duplicated data to delete the duplicated data in the respective file and replace the deleted duplicated data with a reference to the duplicated data in the additional file.

2. The data processing system according to claim 1, wherein the deduplicator is operable at runtime of the data processing system.

3. The data processing system according to claim 1, wherein the de-duplicator uses at least one virtual block mapping table to store and retrieve data in the additional file.

4. The data processing system according to claim 3, further comprising a separate virtual block mapping table for each virtual image of the data processing system.

5. The data processing system according to claim 3, wherein the at least one virtual block mapping table maps physical block numbers.

6. The data processing system according to claim 1, wherein the de-duplicator uses a block by block comparison method to identify duplicated data of virtual images.

7. The data processing system according to claim 1, wherein the de-duplicator uses a file-aware block comparison method to identify duplicated data of virtual images.

8. The data processing system according to claim 1, wherein the de-duplicator is further configured to hash a plurality of blocks to identify duplicated data of virtual images.

9. The data processing system according to claim 1, wherein the deduplicator is operable on more than one host server.

10. A computer program product comprising a computer usable medium including a computer readable program, wherein the computer readable program when executed on a processor causes the processor to run a data processing system comprising:
- a physical disk;
- at least two disk emulators operating in parallel, wherein each of the at least two disk emulators emulates a respective disk subsystem and is associated with a respective file in a file system for any data stored on the physical disk;
- a de-duplicator for de-duplicating the data stored in the respective files associated with the at least two disk emulators, wherein the de-duplicator operates in parallel to the at least two disk emulators, wherein the de-duplicator is associated with an additional disk emulator emulating an additional disk subsystem, wherein the additional disk emulator is associated with an additional file in a file system configured to store data shared between the respective disk subsystems emulated by the at least two disk emulators, wherein the additional file is accessible by each of the at least two disk emulators, and wherein the de-duplicator is configured to:
  - communicate with the at least two disk emulators to identify duplicated data in the respective files associated with the at least two emulators,
  - retrieve the duplicated data and store the duplicated data in the additional file via the additional disk emulator, and
  - instruct each disk emulator among the at least two disk emulators that is associated with a respective file having the duplicated data to delete the duplicated data in the respective file and replace the deleted duplicated data with a reference to the duplicated data in the additional file.

11. The computer program product according to claim 10, wherein the de-duplicator is operable at runtime of the data processing system.

12. The computer program product according to claim 10, wherein the de-duplicator uses at least one virtual block mapping table to store and retrieve data in the additional file.

13. The computer program product according to claim 12, further comprising a separate virtual block mapping table for each virtual image of the data processing system.

14. The computer program product according to claim 12, wherein the at least one virtual block mapping table maps physical block numbers.

15. The computer program product according to claim 10, wherein the de-duplicator uses a block by block comparison method to identify duplicated data of virtual images.

16. The computer program product according to claim 10, wherein the de-duplicator uses a file-aware block comparison method to identify duplicated data of virtual images.

17. The computer program product according to claim 10, wherein the de-duplicator is further configured to hash a plurality of blocks to identify duplicated data of virtual images.

18. The computer program product according to claim 10, wherein the de-duplicator is operable on more than one host server.

19. A de-duplication method performed via a de-duplicator that operates in parallel to at least two disk emulators, wherein each of the at least two disk emulators is associated with a respective file in a file system, wherein the de-duplicator is associated with an additional disk emulator, wherein the additional disk emulator is associated with an additional file in the file system, and wherein the additional file is accessible by each of the at least two disk emulators, the de-duplication method comprising:
- communicating with the at least two disk emulators to identify duplicated data in the respective files associated with the at least two emulators;
- retrieving the duplicated data and storing the duplicated data in the additional file via the additional disk emulator; and
- instructing each disk emulator among the at least two disk emulators that is associated with a respective file having the duplicated data to delete the duplicated data in the respective file and replace the deleted duplicated data with a reference to the duplicated data in the additional file.

20. The de-duplication method according to claim 19, further comprising hashing a plurality of blocks to identify duplicated data of virtual images.

* * * * *